United States Patent
Pettersson et al.

(10) Patent No.: US 9,897,442 B2
(45) Date of Patent: Feb. 20, 2018

(54) METHOD AND SYSTEM FOR DETERMINING SPATIAL COORDINATES WITH A MOBILE COORDINATE MEASURING MACHINE

(71) Applicant: HEXAGON TECHNOLOGY CENTER GMBH, Heerbrugg (CH)

(72) Inventors: Bo Pettersson, London (GB); Pascal Jordil, Ecoteaux (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 222 days.

(21) Appl. No.: 14/421,802

(22) PCT Filed: Aug. 13, 2013

(86) PCT No.: PCT/EP2013/066912
§ 371 (c)(1),
(2) Date: Feb. 13, 2015

(87) PCT Pub. No.: WO2014/026989
PCT Pub. Date: Feb. 20, 2014

(65) Prior Publication Data
US 2015/0219451 A1    Aug. 6, 2015

(30) Foreign Application Priority Data
Aug. 16, 2012  (EP) .................................... 12180720

(51) Int. Cl.
*G01B 5/00* (2006.01)
*G01B 21/04* (2006.01)
(Continued)

(52) U.S. Cl.
CPC ............. *G01B 21/04* (2013.01); *G01B 5/008* (2013.01); *G01B 11/002* (2013.01);
(Continued)

(58) Field of Classification Search
CPC ...... G01B 21/04; G01B 5/008; G01B 11/002; G01B 11/005; G01S 17/42; G01S 17/875
(Continued)

(56) References Cited

U.S. PATENT DOCUMENTS 5,042,162 A * 8/1991 Helms .................... F16F 7/1005
                                                                    248/559
5,086,564 A * 2/1992 Schalz ....................... B25J 18/02
                                                                    188/378
(Continued)

FOREIGN PATENT DOCUMENTS

CN          101918792 A       12/2010
CN          102472615 A       5/2012
(Continued)

OTHER PUBLICATIONS

European Search Report dated Nov. 19, 2012 as received in Application No. 12 18 0720.

*Primary Examiner* — Yaritza Guadalupe-McCall
(74) *Attorney, Agent, or Firm* — Maschoff Brennan

(57) ABSTRACT

The invention pertains to a method for determining at least one spatial coordinate of a measurement point of a local structure of an object, providing a mobile coordinate measuring machine, the method comprising at least placing the mobile coordinate measuring machine on a surface of the object to be measured, approaching the measurement point with a sensing head, and determining at least one spatial coordinate of the at least one measurement point, characterized by establishing a defined spatial relation between the coordinate measuring machine and the local structure wherein the defined spatial relation is established by means of a mechanical fixation of the coordinate measuring machine to the object, and/or a continuous determination of position and orientation of the coordinate measuring machine relative to the object. The invention furthermore (Continued)

pertains to a mobile coordinate measuring machine and a computer program product for execution of said method.

22 Claims, 12 Drawing Sheets

(51) Int. Cl.
    *G01B 5/008*     (2006.01)
    *G01B 11/00*     (2006.01)
    *G01S 17/42*     (2006.01)
    *G01S 17/87*     (2006.01)

(52) U.S. Cl.
    CPC ............ *G01B 11/005* (2013.01); *G01S 17/42* (2013.01); *G01S 17/875* (2013.01)

(58) Field of Classification Search
    USPC .......................................................... 33/503
    See application file for complete search history.

(56) References Cited

U.S. PATENT DOCUMENTS

| | | | | |
|---|---|---|---|---|
| 5,148,377 A * | 9/1992 | McDonald | ............ | G01B 5/0025 33/503 |
| 5,402,582 A * | 4/1995 | Raab | ............ | G01B 5/008 33/1 PT |
| 5,412,880 A * | 5/1995 | Raab | ............ | G01B 5/008 33/503 |
| 5,535,524 A * | 7/1996 | Carrier | ............ | G01B 5/008 33/1 M |
| 5,724,264 A * | 3/1998 | Rosenberg | ............ | G01B 5/008 700/161 |
| 6,192,735 B1 * | 2/2001 | Nagai | ............ | A61B 8/14 73/1.82 |
| 6,289,600 B1 | 9/2001 | Watts | | |
| 6,389,158 B1 * | 5/2002 | Pettersen | ............ | G01B 11/002 382/152 |
| 6,952,882 B2 * | 10/2005 | Raab | ............ | B23Q 35/04 33/1 N |
| 7,395,606 B2 * | 7/2008 | Crampton | ............ | B25J 13/088 33/503 |
| RE40,578 E * | 11/2008 | Trull | ............ | 33/503 |
| RE42,082 E * | 2/2011 | Raab | ............ | B25J 18/002 33/1 N |
| 8,607,466 B2 | 12/2013 | Pettersson et al. | | |
| 8,825,427 B2 | 9/2014 | Kunzmann et al. | | |
| 9,212,889 B2 * | 12/2015 | Teune | ............ | G01B 5/008 |
| 9,348,001 B2 * | 5/2016 | Reid | ............ | G01N 27/90 |
| 9,607,239 B2 * | 3/2017 | Bridges | ............ | G06K 9/4604 |
| 9,696,140 B2 | 7/2017 | Markendorf | | |
| 2004/0148791 A1 * | 8/2004 | Eaton | ............ | G01B 21/047 33/503 |
| 2005/0151963 A1 * | 7/2005 | Pulla | ............ | G01B 21/04 33/503 |
| 2007/0113412 A1 | 5/2007 | Kallabis | | |
| 2007/0153296 A1 | 7/2007 | Schick | | |
| 2008/0084558 A1 | 4/2008 | Thompson et al. | | |
| 2009/0271996 A1 * | 11/2009 | Ferrari | ............ | G01B 21/042 33/502 |
| 2010/0312524 A1 | 12/2010 | Siercks et al. | | |
| 2012/0246953 A1 * | 10/2012 | Engel | ............ | G01B 21/047 33/502 |
| 2013/0232804 A1 * | 9/2013 | Teune | ............ | G01B 5/004 33/503 |
| 2015/0219451 A1 * | 8/2015 | Pettersson | ............ | G01B 5/008 33/503 |
| 2016/0195382 A1 * | 7/2016 | McMurtry | ............ | G01B 21/045 33/503 |

FOREIGN PATENT DOCUMENTS

| | | |
|---|---|---|
| DE | 102 47 920 A1 | 4/2004 |
| EP | 0 491 369 A2 | 6/1992 |
| EP | 1 797 813 A1 | 6/2007 |
| EP | 2 185 890 A1 | 5/2010 |
| EP | 2 244 052 A1 | 10/2010 |
| EP | 2 016 473 B1 | 7/2012 |
| EP | 2602641 A | 6/2013 |
| GB | 2 452 033 A | 2/2009 |

* cited by examiner

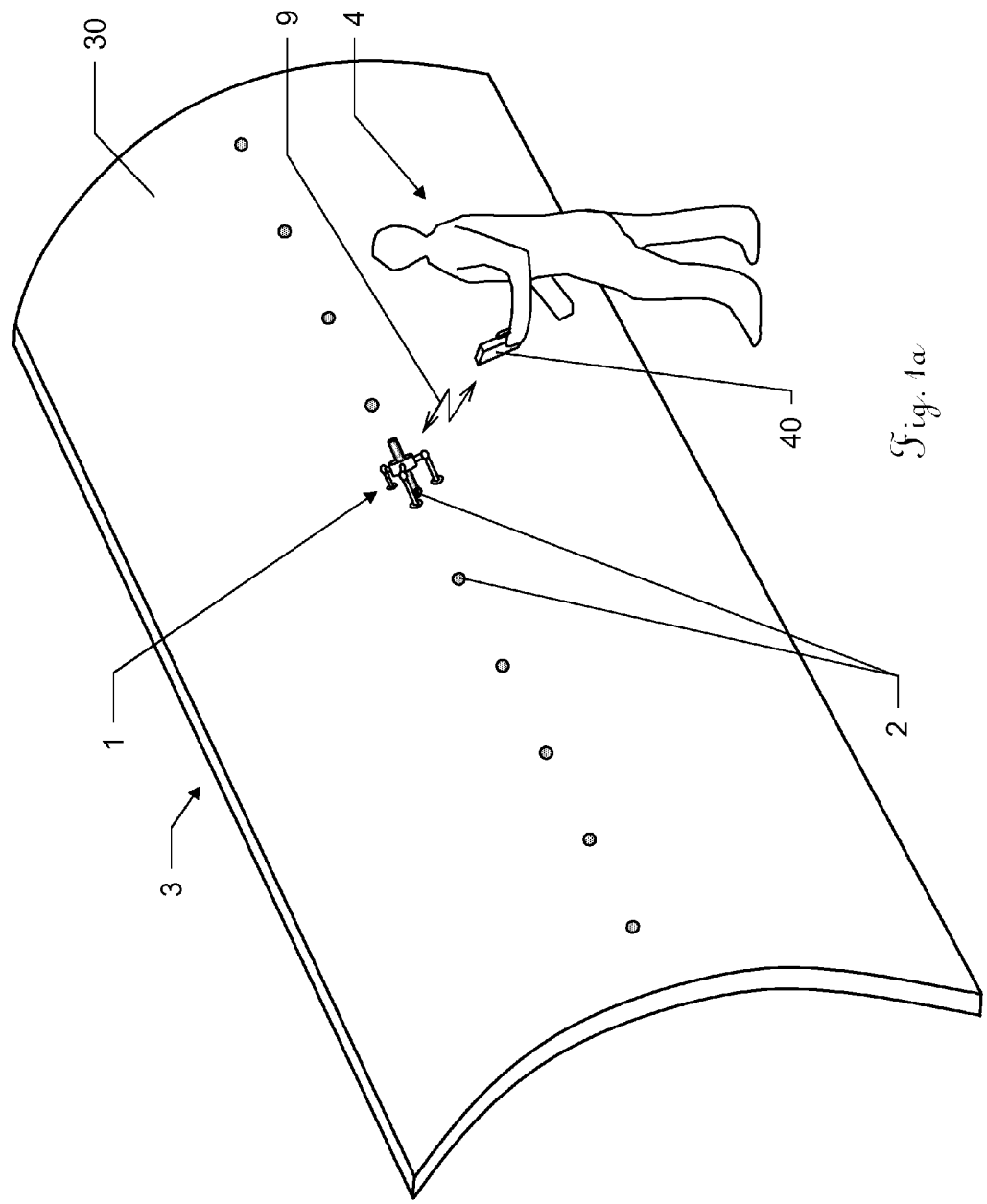

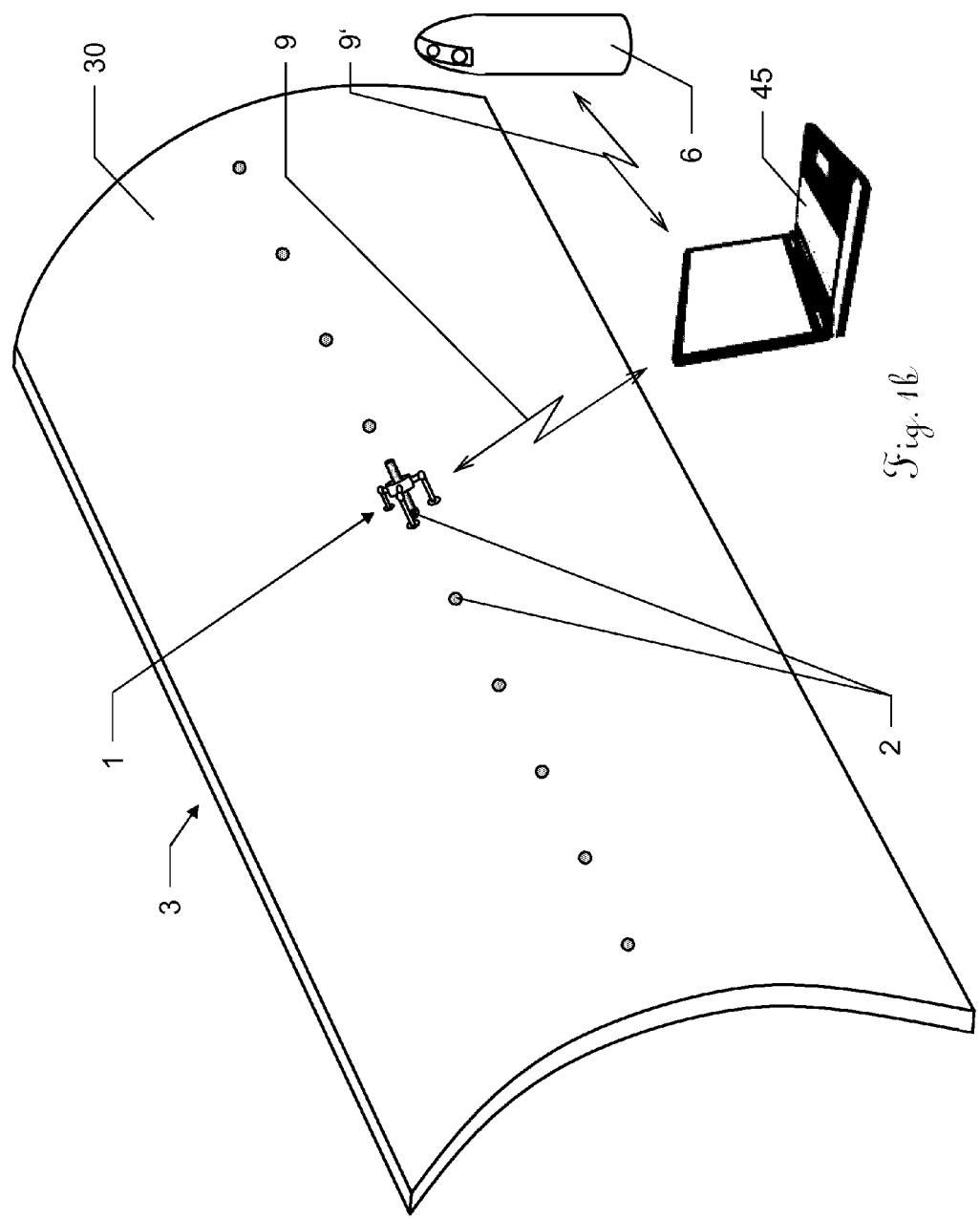

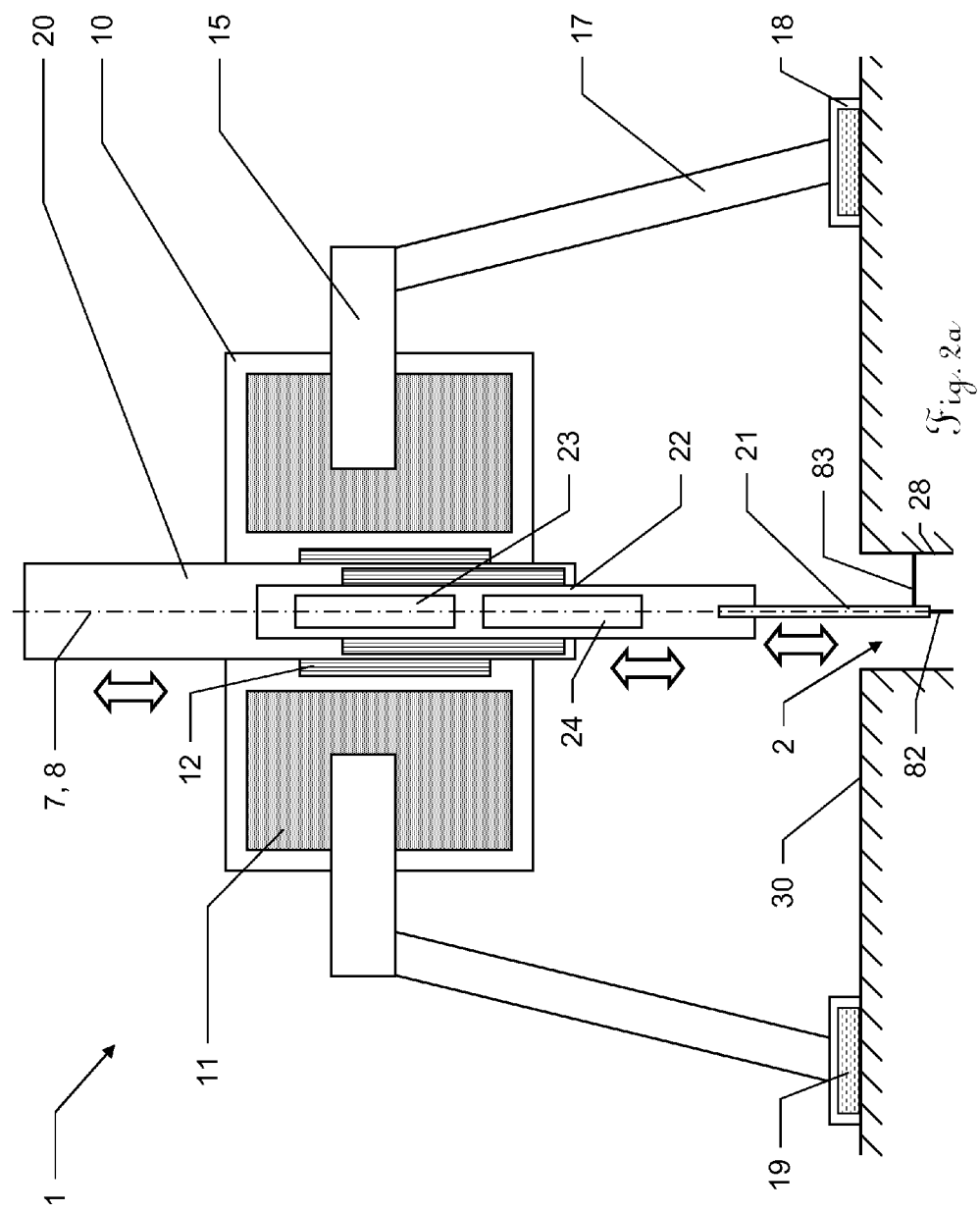

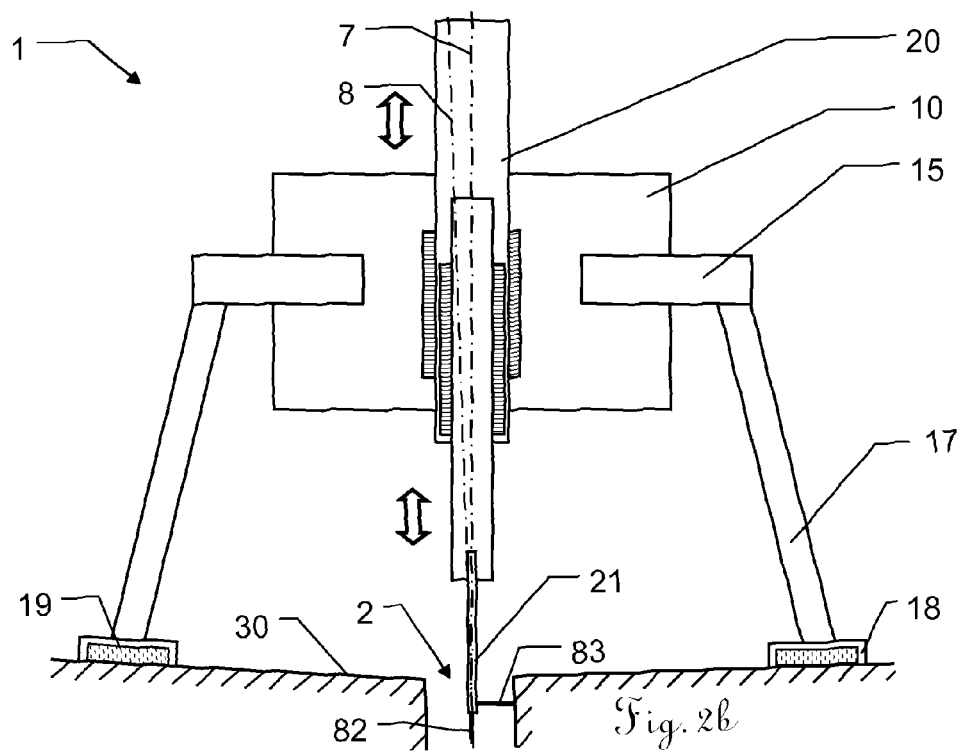
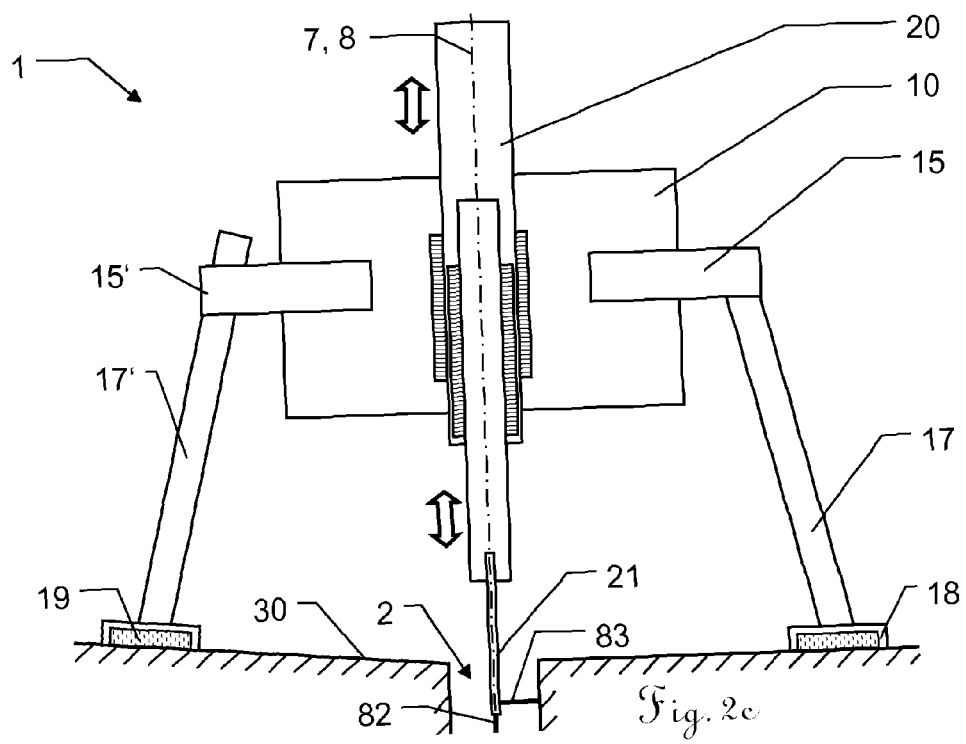

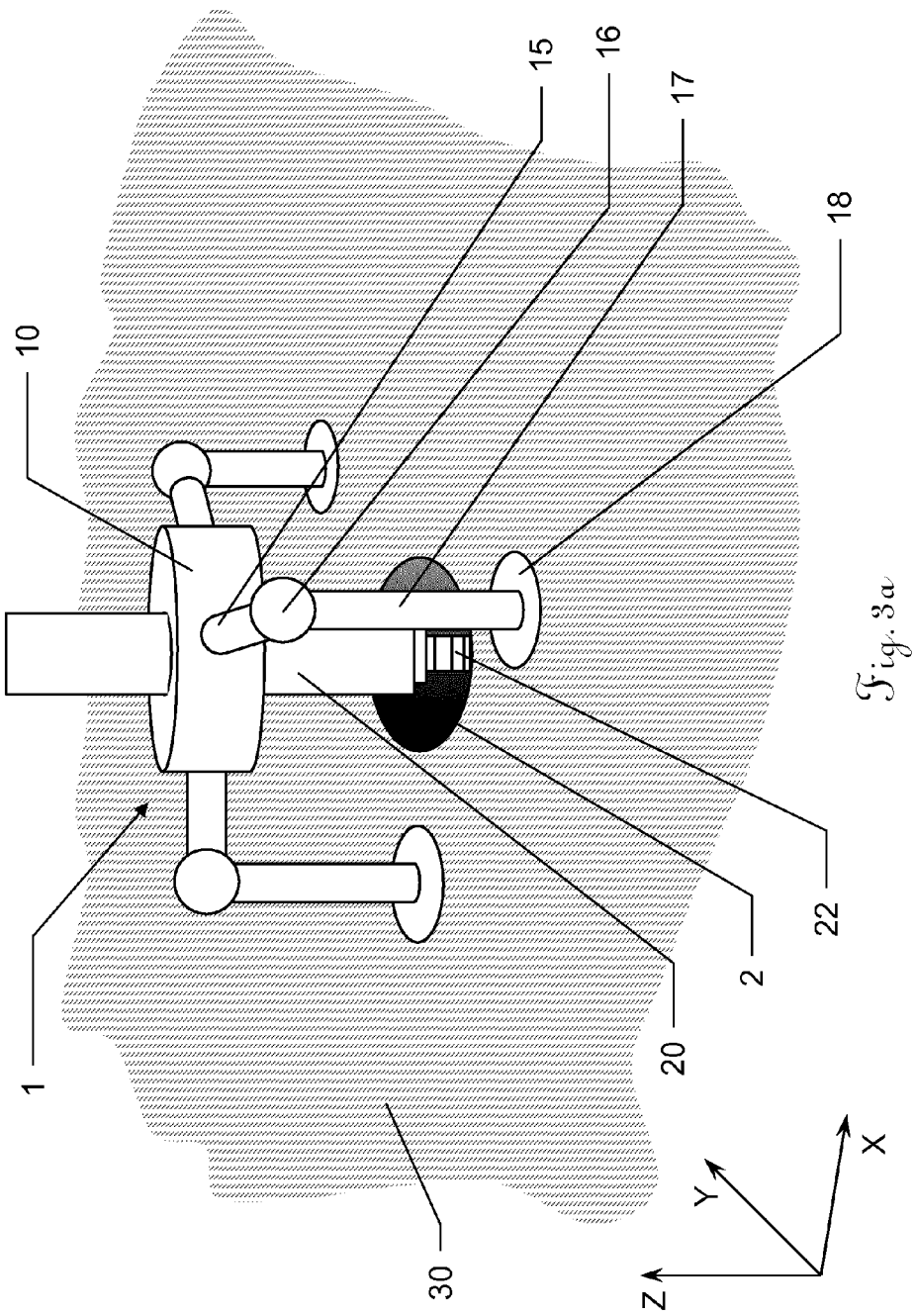

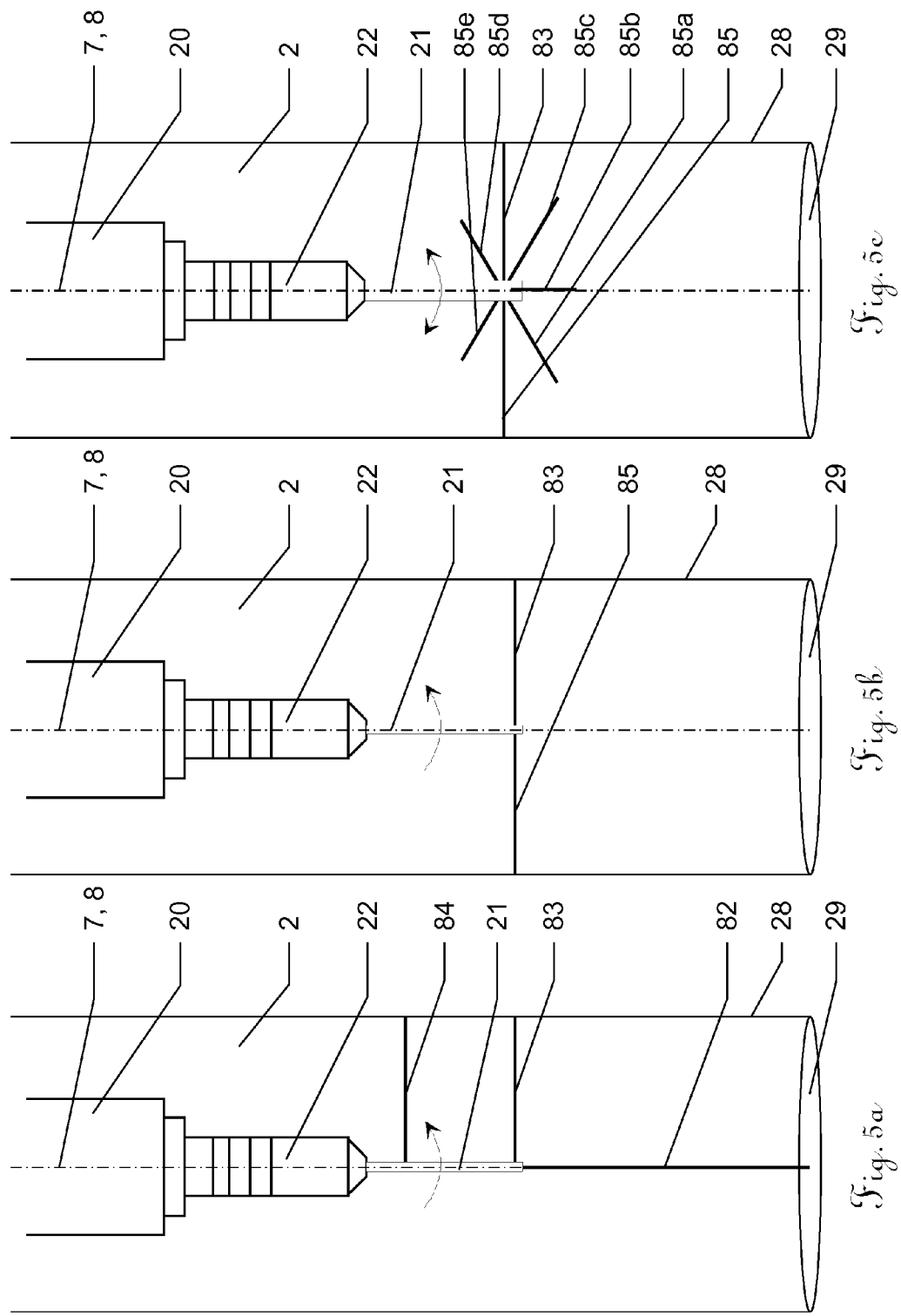

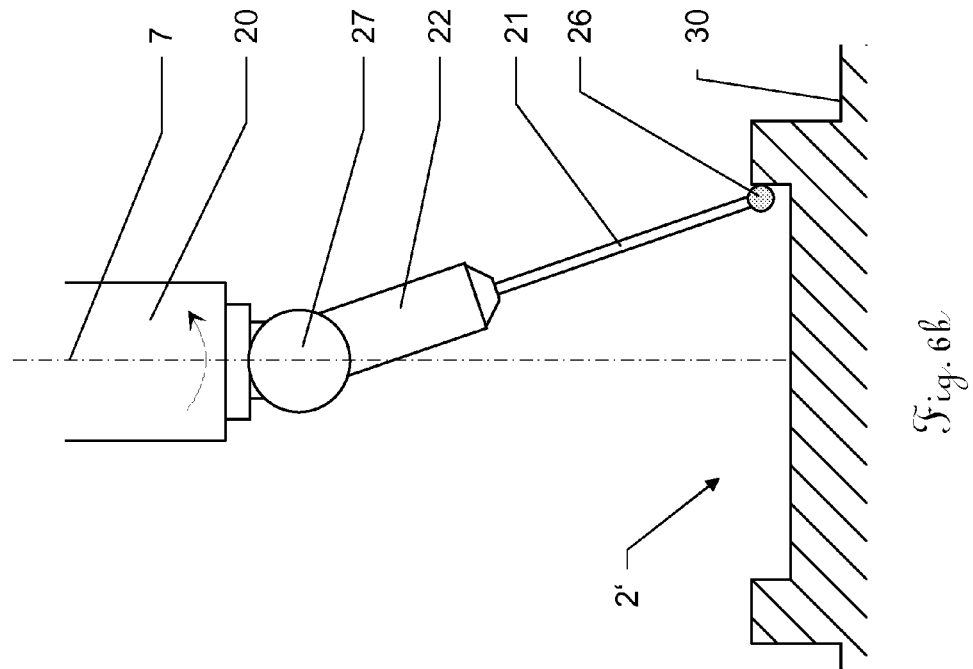
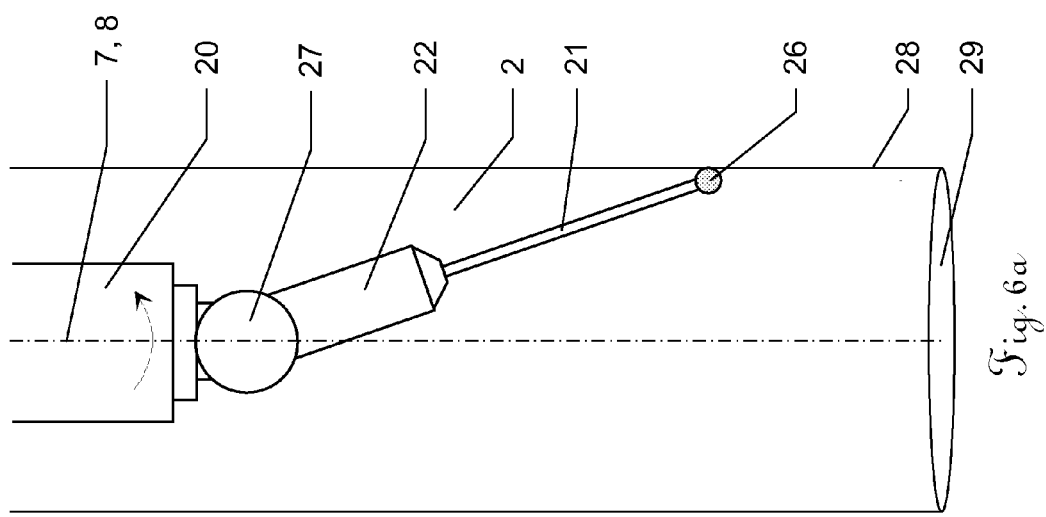

METHOD AND SYSTEM FOR DETERMINING SPATIAL COORDINATES WITH A MOBILE COORDINATE MEASURING MACHINE

FIELD OF THE INVENTION

The present invention relates to a method and a system for measuring local structures, such as the inner wall of a cavity of an object, in particular for measuring a cylindrical boring of a workpiece, making use of a mobile, portable coordinate measuring machine (CMM).

BACKGROUND

It is common practice to inspect workpieces subsequent to production on a coordinate positioning apparatus, such as a coordinate measuring machine having a movable probe head within a working volume of the machine.

In a conventional 3-D measurement machine, the probe head is supported for movement along three mutually perpendicular axes (in directions X, Y and Z). Thereby, the probe head can be guided to any arbitrary point within the working volume of the measuring device.

Stationary measuring devices for measuring local structures such as cylindrical cavities are known from prior art. These machines allow accurate measurement of local structures of an object. However, the measuring rate of measuring machines of this kind is conventionally very low. Additionally, this type of coordinate measuring machine usually can only be used stationarily—the respective object to be measured has to be brought to the measuring machine. These machines, therefore, cannot be used for measuring structures of particularly large objects, for example boreholes in aircraft assembly parts, such as the fuselage or the wings. A hand held coordinate measuring device for the measuring of cavities is disclosed, for example, in EP 1 797 813. This document describes an optical measuring device for measuring the inner wall of a cavity formed in an object according to the confocal imaging principle. A weakness of the described solution is the rather imprecise positioning and orientation of the hand held device during the measurement. Though adaptation means with mechanical coupling elements for a defined positioning of the device during the measurement are disclosed, these cannot eliminate measurement errors caused by holes not orthogonal to the surface of the object or unevenly shaped surfaces.

SUMMARY

Some embodiments of the present invention provide an improved mobile coordinate measuring machine and an improved method and system for determining spatial coordinates of measurement points of local structures of a large workpiece with higher accuracy.

Some embodiments of the present invention provide such a mobile coordinate measuring machine and method for determining spatial coordinates of measurement points of a cavity, such as a borehole.

According to the present invention, a method for determining at least one spatial coordinate of a measurement point of a local structure of an object to be measured comprises the steps of
situating or placing a mobile coordinate measuring machine on a surface of the object to be measured,
establishing a defined spatial relation between the coordinate measuring machine and the local structure,
approaching the measurement point with a sensing head of the mobile coordinate measuring machine, and
determining at least one spatial coordinate of the at least one measurement point.

The defined spatial relation according to the invention is established either by means of a mechanical fixation of the coordinate measuring machine to the object, or a continuous determination of a position and orientation of the coordinate measuring machine—either relative to the object or together with the object relative to a common reference coordinate system.

Therefore, a system with a mobile, portable coordinate measuring machine (CMM) according to the invention which is designed for determining at least one spatial coordinate of a measurement point of a local structure of an object comprises means for fixation of the CMM to a surface of an object and/or means for dynamical determination of the CMM's position and orientation with respect to the object or a reference coordinate system.

According to the invention the mobile CMM comprises a base, sensor means for measuring the measurement point and generating measurement data, and a drive mechanism, adapted to drive the sensor means or parts thereof, in particular a sensing head, relative to the base for approaching the measurement point. According to the invention, during the measuring a position and orientation of the base or the sensor means is defined relative to the local structure or relative to a reference coordinate system, the latter in particular by means of an external surveying instrument. The sensor means, for instance, can be tactile sensor means or, preferably, optical sensor means.

Preferably, the mobile CMM comprises placing means, which allow placing or situating the mobile CMM on a surface of the object, in particular in a standing or suspended manner, in such a way that the CMM remains in this position autonomously. In a preferred embodiment the placing means are built as standing means enabling (under the influence of gravity) the mobile CMM to stand on the surface autonomously, for instance on at least three stands (or feet), in particular having a non-slip texture. In another preferred embodiment the placing means are built as suspending means enabling the mobile CMM to be suspended below the surface.

Advantageously, the standing or suspending means have connecting means for connecting the standing or suspending means fixedly to the surface of the object, so that the mobile CMM is enabled to stand on vertically oriented surfaces or even to hang headfirst below the surface. In particular, the fixed connection is achieved by means of magnets or a vacuum, for example with electromagnets or permanent magnets, suction pads or vacuum pumps. Also other means for fixedly connecting the standing or suspension means to the object are possible: For instance, the fixed connection can be established by adhesive bonding, such as cement, glue, one- or two-component-adhesives or permanently tacky adhesives, or if the CMM is built very light weighted—by connecting means similar to that of Gecko feet through Van der Waals forces. The connecting means can also be designed for a defined mechanical connection with certain features of the object. These features e.g. could be screw threads, pins or rails so that the mechanical connection could be achieved by means of screws or rail bonds. Also, when measuring a local structure of an object, the connecting means even could use this very structure, for instance a borehole, for establishing a fixed and defined connection to the object.

Furthermore advantageously, the connecting means are designed to provide a defined spatial relation between the CMM and the local structure. In particular the accuracy of the spatial relation is at least as high as that of the measurement of the sensor means, i.e. the tolerance of the defined spatial relation is smaller than the tolerance of the determining of the at least one spatial coordinate of the at least one measurement point, in particular at least two orders of magnitude smaller.

Preferably, the CMM comprises damping means for active compensation or absorption of vibrations that occur in the object or in the CMM, for instance due to a movement of the sensing head. Said damping means, which e.g. can comprise piezo actuators, as such are known from prior art.

For a preferred embodiment the local structure is a cavity of an object, in particular a borehole, and the mobile coordinate measuring machine is designed for determining at least one spatial coordinate of a measurement point inside the cavity.

In another preferred embodiment the mobile CMM comprises optical sensor means with a stylus for approaching measurement points, the sensor means having emitter means and receiver means for determining spatial coordinates of the measurement points. Preferably, the base comprises a drive mechanism, adapted to rotate the stylus and to drive the stylus in such a way that it is capable to move relative to the base and to be introduced into a hole of the object. Preferably, a first measurement beam is emitted perpendicular to the rotational axis in order to measure the distances to the hole's outer wall.

In order to measure a diameter of the hole, the stylus of the mobile coordinate measuring machine advantageously has to be introduced into the hole along the hole's central axis, so that the measurement beam measures in a plane orthogonal to the central axis. Otherwise, the diameters of a measured section of a circular hole would be perceived as an ellipse. Also, the stylus must be positioned in or at least near the middle of the hole.

Therefore, the mobile CMM in an advantageous embodiment comprises positioning means for dynamical autonomous positioning of the base relative to the local structure. When the mobile coordinate measuring machine is placed on the object's surface on top of a local structure, such as a hole, accurate positioning is crucial for the provision of accurate measurement data and the reduction of recalculation efforts. If the object's surface is not absolutely flat—for instance being curved or irregular—the vertical axis of the device will not be parallel to the central axis of the hole.

A mechanical positioning will never be absolutely perfect, so that in a preferred embodiment additional software compensation is provided, which for instance can convert elliptic measurements into circular measurements. In order to minimize recalculation efforts, the probe head on the one hand needs to be driven basically parallel to the central axis and on the other hand with a minimized distance to the central axis.

Therefore, advantageously, positioning means with a positioning functionality are provided that are designed in such a way that the base can be positioned centrally over the hole so that the vertical axis of the device—at least approximately—is made coaxial with a central axis of the hole, and the stylus can be introduced into the hole along the central axis. In particular, the positioning means are designed for tilting the base of the mobile CMM and moving it along the directions X and Y.

In a preferred embodiment the positioning means are designed as articulated legs, the legs connecting the base to the stands and comprising each at least two members being movable with respect to each other, to the base and/or to the stands. The movable members have encoder means to detect a position and/or orientation of the single members with respect to each other, to the base and/or to the stands. Articulated legs as such are known from prior art and, for instance, disclosed in EP 2 016 473.

In another preferred embodiment the base comprises hole centring means for centring the base over the hole. The hole centring means comprises at least three centring members attached to the base and designed for entering the hole and then expanding towards the outside homogeneously for applying pressure to the outer wall of the hole in order to move the base in a position centrally over the middle of the hole so that the stylus can be introduced along a central axis of the hole.

Preferably, the mobile CMM uses a laser measurement beam with a frequency-modulated, i.e. tuneable laser source and with an interferometric measuring principle. Such a measuring principle, for instance, is disclosed in the document EP 2 185 890. The measurements then are effected in the frequency level. Deviations from perpendicular incidence of the laser beam on the surface in the distance measurement are taken into account algorithmically or with control during probing of the optical probe head as a measuring sensor. For the intended field of use of the optical system in a coordinate measuring device with free-beam measurements of a few centimeters using compact probe heads having diameters in the region of ruby spheres, the abovementioned interferometric method is preferable. In this frequency-modulated interferometry, a source which should permit broadband tuning in a short time is used. Moreover, narrow-band characteristics with a coherence length of a few centimeters are required. The tuning of the source is referenced via a calibration interferometer, the length of which being known very precisely. In order to eliminate or reduce environmental influences, such as, for example, temperature changes or vibrations originating from the measuring machine, in the measuring interferometer, the reference surface is placed on a surface as far as possible within the optical probe head, or such a surface is used as the reference surface so that a common path interferometer is realized. It is advantageous here if a sufficient quantity of light is input from this surface back into a monomodal fibre, whereas other optical transitions as far as possible should not feed back the signal into this fibre. The laser source is preferably in the form of a fibre ring laser having an optical semiconductor amplifier as an amplifying medium and a tuneable filter element. The tuneable element may be formed, for example, as a Fabry-Perot filter or as an acoustically tuneable fibre Bragg grating. Further elements are optical couplers or insulators, the use and integration of which in such a system are known to the person skilled in the art. If higher repetition rates are desired in the measurement, the fibre ring laser can be extended by a fibre length of several kilometers, the repetition rate corresponding to the inverse of the transit time of the light in the fibre ring.

As with coordinate measuring machines known from prior art, for calibration of the mobile coordinate measuring machine according to the invention a standardized calibration object can be used. If the CMM of the present invention is adapted for measuring drill holes, a calibration object formed as a hollow cylinder can be used. At least one, but preferably a multitude of different calibration objects, i.e. hollow cylinders of different diameters, should be used for calibration. With this calibration process reproducible measurement errors, such as errors of measuring linearity, the beam orientation or a wobble, can be compensated.

In a preferred embodiment the sensor means is designed for simultaneously emitting more than one measurement beam. For instance, in the case of measuring inside a hole, two measurement beams emitted by the stylus in opposite directions (with an angle of 180°) can be used to solve the wobble problem. With two measurement beams emitted parallel to each other, it is possible to detect if the stylus' rotational axis is parallel to the hole's central axis. An additional vertical measurement beam can detect the distance to the bottom of the hole and thus the hole's depth. With a multitude of measurement beams, i.e. six or more measurement beams, emitted in different directions at the same level, a complete rotation of the stylus is not necessary, but only a rotation of 360° divided by the number of measurement beams. With a large enough number of measurement beams a rotation of the stylus would be completely dispensable.

In a preferred embodiment the stylus or the whole sensor means unit is exchangeable. Thus, with the same CMM different measurement tasks could be performed, for example by optical means as well as by tactile means. Alternatively, the stylus can be built adaptable. For instance, with an adaptable stylus the user can choose whether the direction of a second measurement beam should be parallel to the first measurement beam or orthogonal.

Preferably the base can comprise scanner means for scanning the surface of the object or the feature to be measured. The scanner means in particular comprise a line laser rotatable around the same rotary axis as the stylus. The scanning means can be used for measuring certain surface features, which cannot be measured by the stylus. This way production errors and damages of the surface and its features can be detected. For instance, a head of a countersunk bolt and its alignment with the surface of the object can be measured with a diagonally aligned laser line beam. A gap between the bolt head and the surface of the countersunk hole—being an indicator for a badly inserted bolt—then can be detected. Also, the scanner means can be used to measure an alignment of the CMM with respect to the surface or a feature.

In a preferred embodiment the mobile coordinate measuring machine comprises storing and calculation means, in particular for storing the measured data and/or measuring programmes and for calculating compensations for known reproducible errors.

Preferably, the mobile coordinate measuring machine comprises wireless communication means for exchanging data with external devices, such as hand held display and control devices, local or remote computers, or peripheral surveying equipment. The wireless communication means for example can be based on Bluetooth or Wireless Local Area Network connections.

In a preferred embodiment the mobile coordinate measuring machine comprises active and/or passive means that enable an accurate determination of its position and orientation relative to the object or with respect to a reference coordinate system.

Active means can be internal surveying means, allowing to actively determine a position and orientation of the CMM relative to the object, for instance relative to a local structure to be measured or relative to visible features on the object. Also, the internal surveying means could determine a position and orientation of the CMM relative to external surveying means that determines a relative position and orientation of the object.

Additionally or alternatively, also passive means can be provided. For instance, the passive means can be visible features that are detectable by external surveying equipment, such as stereo camera systems or laser trackers. The detection of the visible features enables a detection of the position and orientation of the mobile coordinate measuring machine relative to the surveying equipment, preferably in six degrees of freedom (6-DoF). For instance, this can be achieved with a camera or a plurality of cameras, i.e. a stereo camera system, or a laser tracker with an additional camera. A laser tracker system of this kind is, for instance, disclosed in the European patent application with the filing number 11192216.7. The external surveying equipment can also be designed to determine a position and orientation of the object and, thus, the local structure. For this purpose, detectable visible features could also be placed fixedly on the surface of the object.

In a further preferred embodiment the mobile coordinate measuring machine is capable of autonomously detecting local structures, such as holes, on the surface of an object, for instance by means of a camera. Alternatively or additionally, the position of the local structures can be provided by pre-stored CAD-data or by an external camera system. The mobile coordinate measuring machine preferably also comprises an autonomous movement unit to autonomously move over the surface to a detected local structure, to autonomously measure the local structure, particularly after having positioned itself relative to the structure—e.g. centrally over a hole—and then to autonomously move on to the next local structure. The standing means can comprise wheels and/or rolls that can be driveable by motor means to move the mobile CMM on the surface. These wheels and/or rolls also can be retractable in order to ensure a reliable and defined stand. Alternatively, the autonomous movement unit comprises a walking functionality in which legs of the mobile CMM can be moved in such a way that the mobile coordinate measuring machine can be repositioned by "walking" on the surface to a distant position, in particular to a detected local structure. Also, means for driving the CMM along a rail can be provided, the rail being a part of the object—temporarily or permanently—or of a structure temporarily attached to the object and connecting local structures to be measured.

BRIEF DESCRIPTION OF THE DRAWINGS

The invention in the following will be described in detail by referring to example embodiments that are accompanied by figures, in which:

FIGS. 1a-b show a mobile CMM according to the invention 5 placed on a large object;

FIGS. 2a-c show an example embodiment of a mobile CMM according to the invention in a sectional view;

FIGS. 3a-c show two preferred embodiments of the positioning means of a mobile CMM according to the invention;

FIGS. 5a-c show further embodiments of a stylus of a mobile CMM according to the invention with optical sensor means;

FIGS. 6a-b show an embodiments of a stylus of a mobile CMM according to the invention with tactile sensor means;

DETAILED DESCRIPTION

Figure 3B:
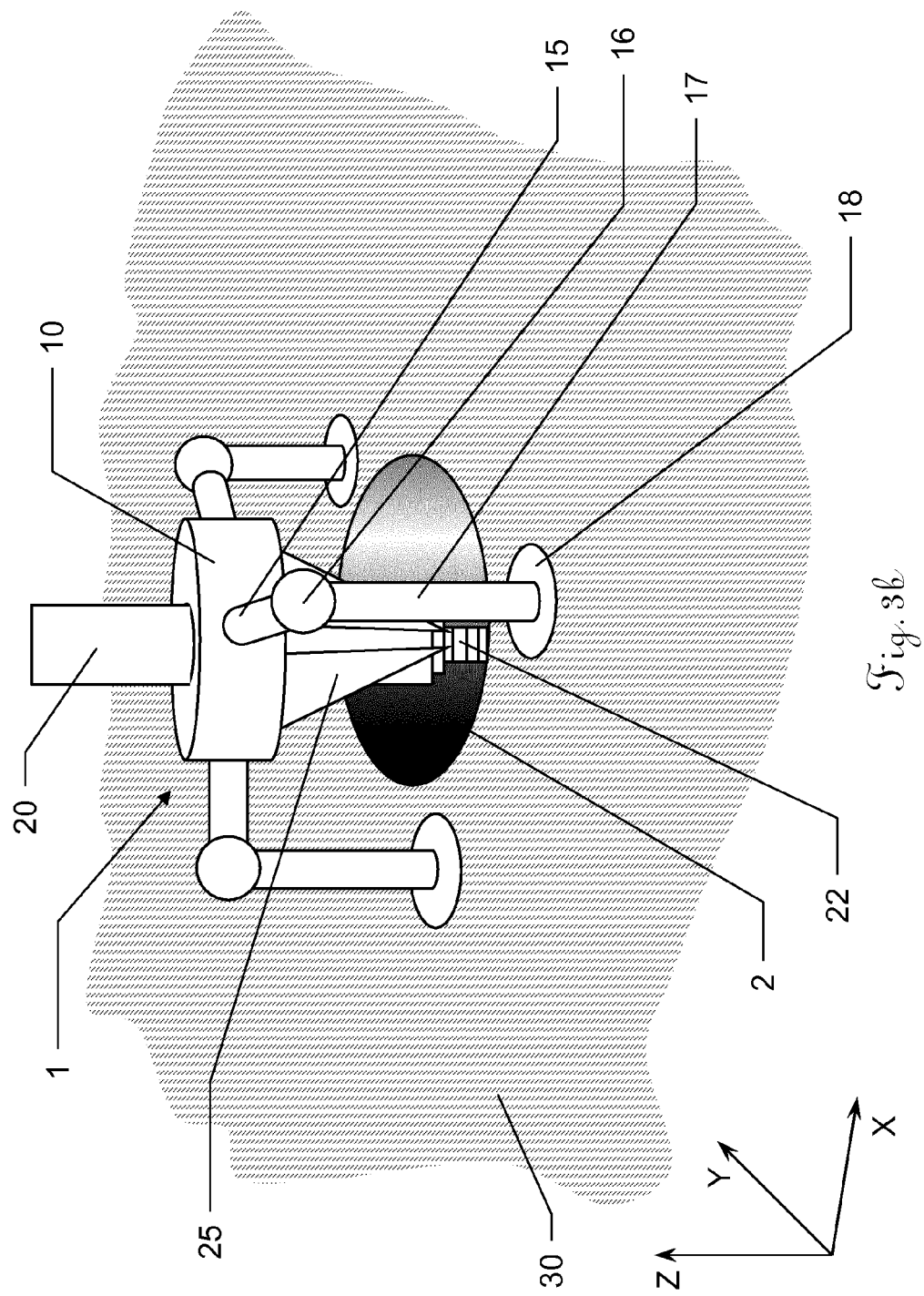

In FIG. 1*a* a mobile CMM 1 is depicted which has been placed on a surface 30 of a large object 3—here a part of a fuselage—by a user 4, the object 3 having a multitude of drill holes 2. The mobile CMM 1 is centred over one of the drill holes 2, autonomously measuring the inner surfaces of the drill hole 2.

The measurement results are sent to an external display and control device 40 by means of a wireless connection 9 and displayed to the user 4. As the mobile CMM 1 is standing on the surface 30 by itself, the user 4 has his hands free during the measuring process. The user 4 can also control functions of the mobile CMM 1 with the external display and control device 40 by means of a wireless connection 9.

In FIG. 1*b*, additionally, a surveying instrument is provided for detecting structures of the large object 3, determining the position of the holes 2 of the object 3 and/or determining the actual position and orientation of the mobile CMM 1 relative to the nearest hole 2 or to a reference coordinate system. In this example, the surveying instrument is as a laser tracker device 6. For evaluation, the measurement results of the mobile CMM 1 and the laser tracker device 6 are sent to an external computer 45 by means of wireless connection 9,9'. Obviously, the wireless connections 9,9' could also be replaced by wire-based connections.

In FIGS. 2*a* to 2*c* a first embodiment of a mobile CMM 1 according to the invention is depicted in a schematic sectional view.

FIG. 2*a* shows the mobile CMM 1 placed on the surface 30 of a workpiece and positioned over a drilling hole 2 to be measured. The surface 30 around the hole 2 is even and the central axis 8 of the hole 2 is orthogonal to the surface 30. The mobile CMM 1 comprises a base 10 and a primary vertical member 20 being movable to the base 10 along a rotational axis 7 by means of a drive mechanism 12. A stylus 21 is attached to a secondary vertical member 22 which is attached to the primary vertical member 20—the secondary vertical member 22 is optional, the stylus 21 could also be attached directly to the vertical member 20. The stylus 21 and the vertical members 20,22 are movable in a telescopic or extendible manner with respect to each other along the rotational axis 7 so that the stylus 21 can be introduced deeply into the hole 2. By means of the drive mechanism 12 the vertical member 20 together with the stylus 21 can be rotated around the rotational axis 7.

Emitter means 23 and receiver means 24 are provided for emitting two measurement beams, in particular laser beams, through the stylus 21 into the hole 2 and receiving reflected light for the deduction of measurement point coordinate data. The stylus is adapted for guiding the emitted measurement beams 82,83 into the hole 2 by means of optical elements, such as mirrors, and/or by means of optical fibres (not shown). A first measurement beam 83 is emitted orthogonally to the rotational axis 7 against a wall 28 of the hole 2. A vertical measurement beam 82 is emitted towards the bottom of the hole 2. Reflections of the beams are then guided through the stylus 21 to the receiver means 24 for evaluation and deduction of distance values. The evaluation, for instance, can be based on interferometric methods.

The CMM 1 rests on the surface 30 by standing means 18. In this embodiment the standing means 18 are built as a multitude of (at least three) stands that are connected to the base 10 by means of legs. The legs comprise leg members 15,17 that are movable with respect to each other, the base 10 and/or the stands 18. The stands 18 comprise connecting means 19, for instance magnets or suction caps, for secure connection of the stands 18 with the surface 30. In this figure, the surface 30 around the hole 2 is even, so that the rotational axis 7 equals the central axis 8 of the hole 2.

The base 10 comprises rechargeable battery means 11 as a source of electric energy for the other components.

In FIGS. 2*b* and 2*c* the same CMM 1 of FIG. 2*a* is shown, the surface 30 on which the CMM 1 is placed now being uneven and irregular, as it is not entirely orthogonal to the central axis 8 of the hole 2.

The CMM 1 shown in FIG. 2*b* due to this irregularity of the surface 30 is not positioned correctly. Thus, the rotational axis 7 of the CMM 1 differs from the central axis 8 of the hole 2. Based on distance values from the hole 2 received through measurements with the measurement beams 82,83 calculation means of the CMM 1 can calculate an angular and positional dislocation between the rotational axis 7 and the central axis 8 and start a positioning procedure by giving positioning commands to positioning means of the CMM 1. Also, additional perception means (not shown) on the base 10, such as a camera pointed towards the hole 2, could provide data for the calculation of a dislocation of the CMM 1—even before the stylus 21 is introduced into the hole 2.

In FIG. 2*c* the CMM 1 is shown after having been positioned correctly over the hole 2. The positioning means 15',17' of one of the legs of the mobile CMM 1 have been rearranged with respect to the situation depicted in FIG. 2*b* in order to position the CMM 1, so that the rotational axis 7 of the stylus 21 now coincides with the hole's central axis 8.

Figure 3C:
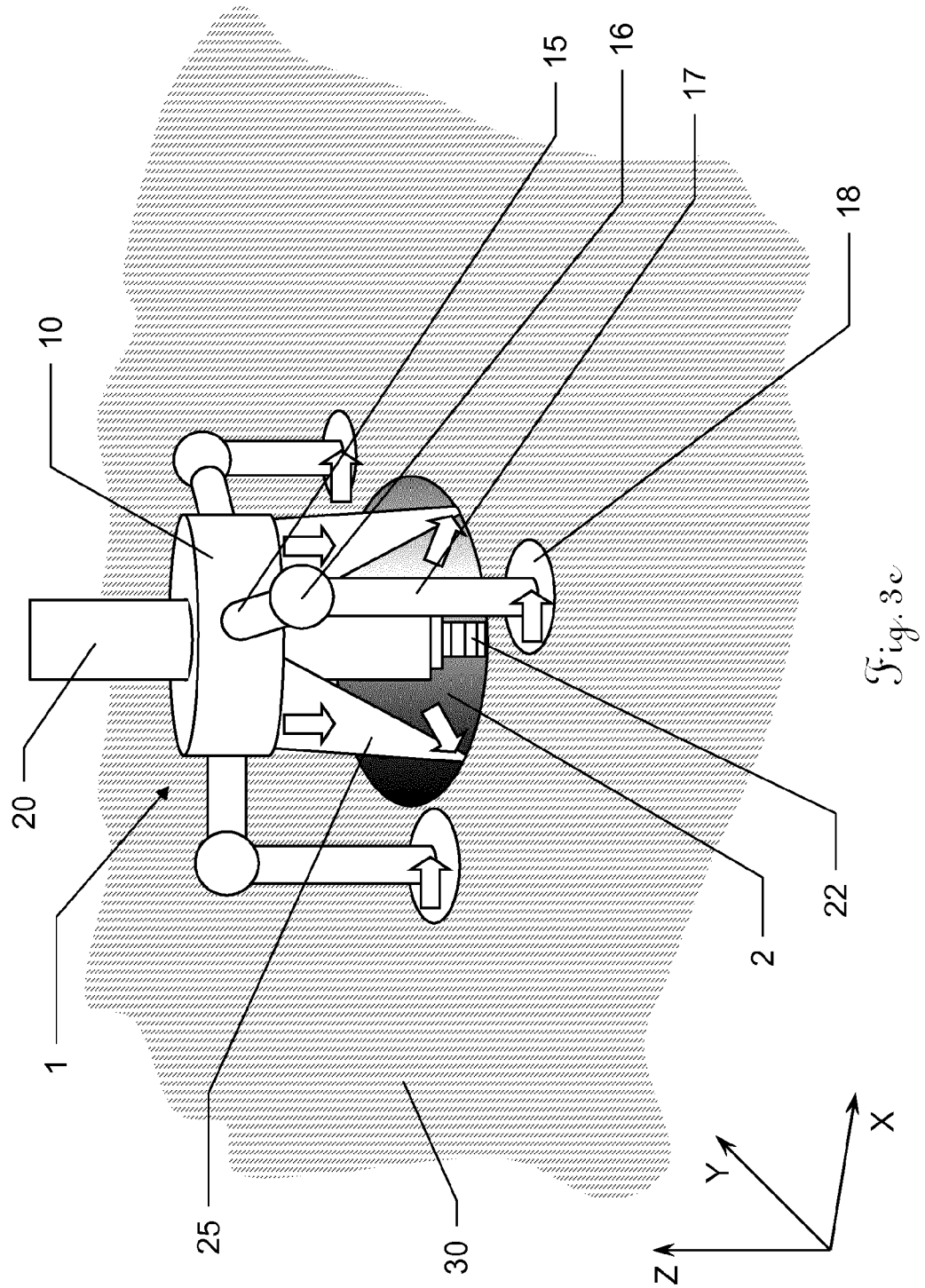

In FIGS. 3*a* to 3*c* two further exemplary embodiments of a mobile CMM 1 according to the invention are depicted.

FIG. 3*a* shows a second embodiment of the mobile CMM 1 according to the invention. It is placed on the surface 30 of an object to be measured. The CMM 1 comprises a base 10 which is centred over a hole 2. A vertical member 20 is provided at the base 10 being movable along a rotational axis with respect to the base 10. A secondary vertical member 22 is provided on the vertical member 20 and introduced into the hole 2. A stylus (not shown) is provided on the secondary vertical member 22 and rotatable around the rotational axis. The CMM 1 stands autonomously on the surface 30 by means of three stands 18 connected to the base by three legs, each having three leg members 15,16,17 being movable with respect to another and having encoder means (not shown) for detecting a position and/or orientation of the single members 15,16,17 with respect to each other, to the base 10 and/or to the stands 18. In this embodiment the three leg members 15,16,17 of each of the three legs are designed as positioning means of the CMM 1.

FIGS. 3*b* and 3*c* show a third embodiment of the mobile CMM 1 according to the invention. As a difference to the second embodiment of FIG. 3*a* this embodiment comprises hole centring means 25 for positioning of the CMM 1. These can be provided as positioning means alternatively or additionally to the leg members 15,16,17. The hole centring means 25 comprises at least three centring members (only two are visible due to the perspective view) attached to the base 10 and designed for entering the hole 2 and then expanding towards the outside homogeneously for applying pressure to the outer wall of the hole 2 in order to move the base 10 in a position centrally over the middle of the hole 2.

In FIG. 3b the hole centring means 25 are shown in their initial position, partially retracted into the base 10. As the mobile CMM 1 is not positioned centrally over the hole 2, the rotational axis of the CMM 1 differs from the central axis of the hole 2. Based on distance values from measurements inside the hole 2 calculation means of the CMM 1 can calculate an angular and/or positional dislocation between the rotational axis and the central axis and start a positioning procedure by giving positioning commands to positioning means of the CMM 1. Also, additional perception means (not shown) on the base 10, such as a camera pointed towards the hole 2, could provide data for the calculation of a dislocation of the CMM 1—even before the stylus is introduced into the hole 2.

In FIG. 3c the positioning procedure of the CMM 1 using the hole centring means 25 is illustrated by arrows indicating movement directions. First, the hole centring means 25 are retracted from the base 10 towards the surface 30 and, thus, partially enter the hole 2 (vertical arrows). Then the members of the hole centring means 25 move towards the outer walls of the hole 2 (diagonal arrows). As the CMM 1 is not centred, the members do not reach the wall at the same time. The member that reaches the wall first applies a pressure to the outer wall of the hole 2, thus pushing the CMM 1 into the opposite direction (horizontal arrows). The stands 18 for easier movement on the surface 30 can comprise wheels or rollers which also can be retractable in the stands 18. The members of the hole centring means 25 move homogenously, so that in the end the base 10 is positioned centrally over the hole 2 so that the stylus can be introduced into the hole 2 along the central axis of the hole 2.

Figure 4B:
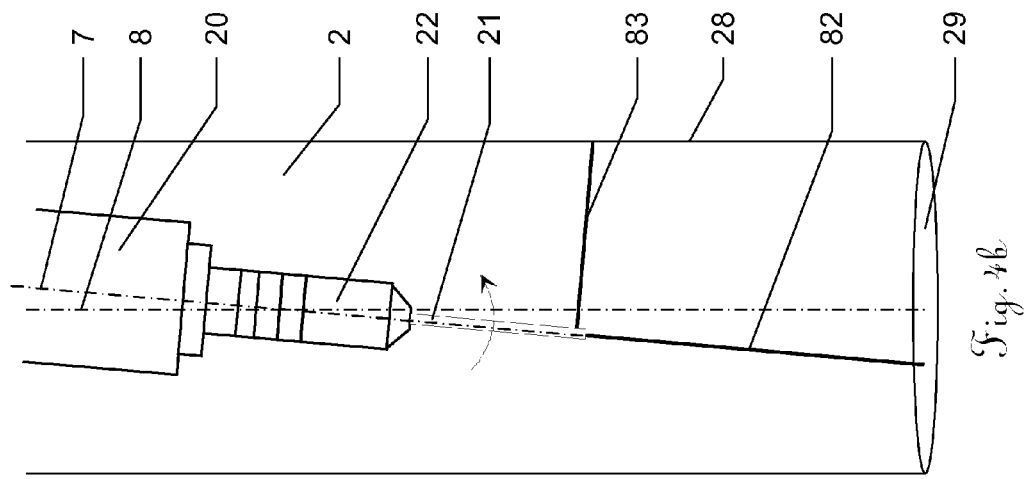
FIGS. 4a-b show a first embodiment of a stylus of a mobile CMM according to the invention with optical sensor means.
Figure 4A:
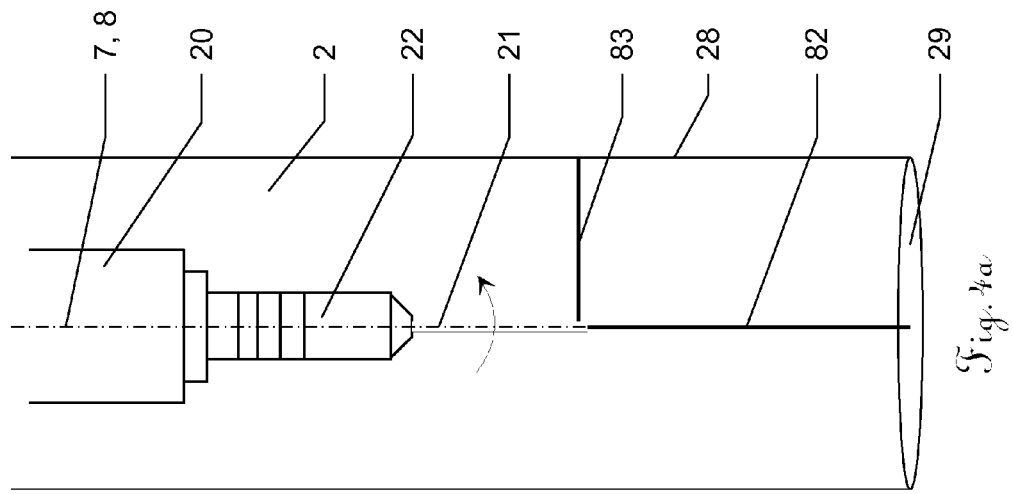

In FIGS. 4a and 4b an exemplary embodiment of a stylus according to the invention is depicted being introduced into a hole 2 of a workpiece. The stylus 21 is adapted to emit two measurement beams 82,83 into the hole 2 and to rotate around a rotational axis 7. The stylus 21 is attached to a secondary vertical member 22 which is attached to a primary vertical member 20, all of which being movable in a telescopic or extendible manner with respect to each other—and to a base of the CMM (not shown)—along the rotational axis 7. The stylus is introduced into a hole 2 having an outer wall 28 and a bottom 29.

In FIG. 4a the rotational axis 7 equals the central axis 8 of the hole 2. This is the ideal arrangement of the two axes 7,8 for the measurement of the hole 2, as no recalculation of the measurement data has to be carried out. The emitting segment of the stylus 21 is positioned centrally in the hole 2 and the first measurement beam 83 is emitted in an angle of 90° to the hole's central axis 8. While continuously or repeatedly emitting the first measurement beam 83 the stylus 21 is rotated around the central axis 7, thus emitting the first measurement beam 83 to a plurality of measurement points on a wall of the hole 2.

In FIG. 4b the rotational axis 7 differs from the central axis 8 of the hole 2. The distances measured with the rotating first measuring beam 83 will, thus, lead to the false appearance of an elliptic hole. Based on measurements at different depths of the hole 2 calculation means of the CMM (not shown) can calculate a deviation of the rotational axis 7 from the hole's central axis 8 and have positioning means of the CMM (not shown) to reposition the CMM.

In FIGS. 5a to 5c three further exemplary embodiments of styluses of a mobile CMM 1 according to the invention are depicted. Each stylus 21 is attached to a secondary vertical member 22 which is attached to a primary vertical member 20, at least partially being introduced into a hole 2. The holes 2 have an outer wall 28 and a bottom 29.

In FIG. 5a the stylus 21 is adapted to emit three measurement beams 82,83,84 and to rotate around a rotational axis 7. As a difference to the embodiment depicted in FIG. 4a an additional measurement beam 84 is emitted parallel to the first measurement beam 83. This parallel measurement beam 84 is emitted at a different depth of the hole 2, but parallel and in the same direction as the first measurement beam 83. With these two measurement beams 83,84 emitted parallel to each other, it is possible to detect if the rotational axis 7 is parallel to the hole's central axis 8.

In FIG. 5b the stylus 21 is adapted to emit two measurement beams 83,85 in opposite directions (with an angle of 180°) and to rotate around a rotational axis 7. With the two measurement beams 83,85 emitted in opposite directions a wobble (shaking, trembling, vibration, etc.) of the stylus 21 can easily be detected.

In FIG. 5c the stylus 21 is adapted to emit a multitude of measurement beams 83,85,85a-e. Instead of two measurement beams as shown in FIG. 5b, a multitude of measurement beams 83,85,85a-e is emitted at the same level of the stylus 21 into different directions. Here, six measurement beams are shown, but of course even more are possible. With this multitude of measurement beams 83,85,85a-e emitted in various different directions at the same level, no complete rotation of the stylus 21 is necessary for complete measuring of the hole's outer wall 28 but only a rotation of 360° divided by the number of measurement beams. Here with six beams, a swivel of the stylus 21 of 60° forth and back would be sufficient. With a large enough number of measurement beams a rotation of the stylus 21 could also be completely dispensable.

Naturally, the different measurement beams 82-85,85a-e of the depicted exemplary embodiments can be combined with each other. Preferably, the stylus 21 and/or the secondary vertical member 22 can be exchangeable, so that different arrangements of measurement beams 82-85,85a-e can be used on the same CMM 1. Alternatively, the stylus 21 can be adaptable so that the measurement beams 82-85 can be emitted from the same stylus 21 in different directions according to the needed measurement.

The FIGS. 6a and 6b show another embodiment of the stylus 21 being equipped with a tactile sensing head 26, i.e. a ruby sphere. The primary vertical member 20 is rotatable around the rotational axis 7 and connected with the secondary vertical member 22 by a hinge 27 so that the stylus 21 with the tactile sensing head 26 is tiltable towards the measuring point. The hinge 27 is adjustable manually or, preferably, by actuator means. A position of the hinge 27 can be calibrated automatically by means of an integrated calibration system, particularly comprising a camera or a tactile system.

In FIG. 6a the stylus 21 is depicted measuring a measuring point on the outer wall 28 of a hole 2, the rotational axis 7 equalling the central axis 8 of the hole 2. In FIG. 6b the stylus 21 is depicted measuring a measuring point on a raised local structure 2' on the surface 30 of the object.

Figure 7A:
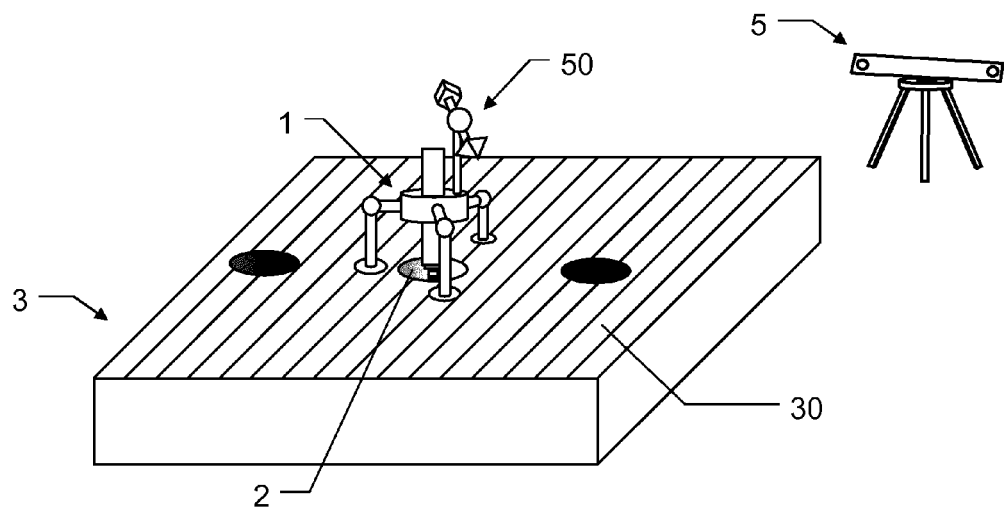
FIGS. 7a-b show two preferred embodiments of the system according to the invention, the CMM having visual features for determining its position and orientation.
Figure 7B:
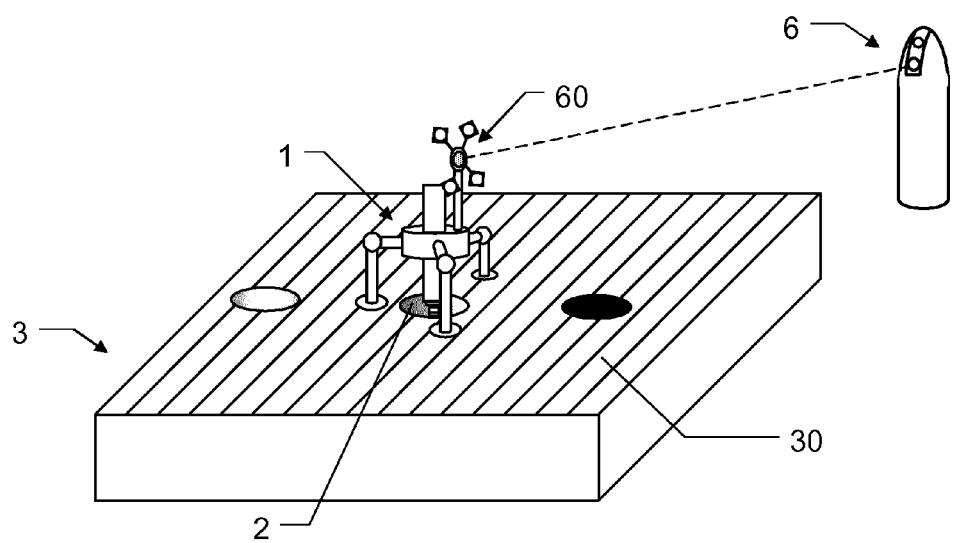

In FIGS. 7a and 7b two preferable embodiments of a system for determining spatial coordinates of a measurement point of a local structure of an object are depicted, wherein the mobile CMM 1 comprises visible features 50,60 that are built in such a way, that they are identifiable by peripheral surveying means 5,6 so that a position and orientation of the mobile CMM 1 relative to the surveying means 5,6 is derivable.

In FIG. 7a the surveying means is a stereo camera system 5 having a multiplicity of cameras (or alternatively a single camera), and the visible features are identifiable in an image of the stereo camera system 5. The visible features are an arrangement of passive visible features such as one or more geometrical objects 50 of well defined shape and/or colour. They can also comprise fluorescent or retro reflective surfaces. For example, they can provide contrast faces and/or a known shape or geometry for making them identifiable in the image of the cameras of the stereo camera system 5. The visible features can be naturally occurring features which are visible and identifiable in the image, for example textures, edges, differently coloured sections, etc. They can also be embodied by artificially applied visible features such as markers attached by means of sticking, magnets, adhesion, suction cups, glue, screws, bolts, clamps, etc.

The visible features can also be active light points, for example in form of optical emitters such as light bulbs, LEDs, lasers, fluorescent material, etc. which are emitting continuous or pulsed light. As a single visible feature, in particular of unknown shape and size, is in general not sufficient to determine a spatial reference in five or six degrees of freedom, a set of multiple visible features is used for referencing by the cameras. The mobile CMM 1 can for a example be equipped with an arrangement of multiple LEDs as active visible features, wherein the arrangement is built in such a way that its position and orientation can be determined uniquely, for example assisted by blinking codes, different colours, etc.

In FIG. 7b the surveying means is a laser tracker system 6 having a laser tracker and a camera. The visible features are built as a measuring aid 60 comprising a retro-reflector traceable by the laser tracker for measuring a position of the mobile CMM 1 and other features, in particular active light points that are identifiable in the image of the camera for deriving an orientation of the mobile CMM 1.

The depicted laser tracker 6 by means of a laser beam measures the distance to the retro-reflector of the measuring aid 60. The depicted measuring aid 60 furthermore comprises a multitude of target markers, for instance built as reflecting or active light points which are arranged in a known configuration with respect to the base 10 of the CMM 1. The laser tracker 6 comprises a measuring camera, in particular built as a focusable camera system with variable zoom, for detection of the target markers of the measuring aid 60. Based on the detected positions of the target markers the orientation of the measuring aid 60 and, thus, of the CMM 1 is derivable.

Figure 8A:
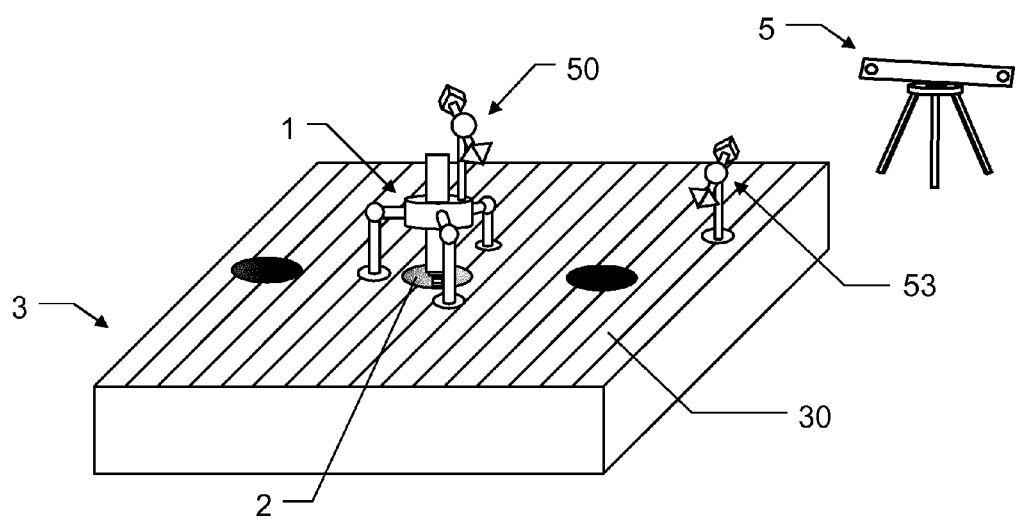
FIGS. 8*a-b* show two more embodiments of the the system according to the invention, the CMM and the object having visual features for determining the position and orientation of the CMM relative to the surface.
Figure 8B:
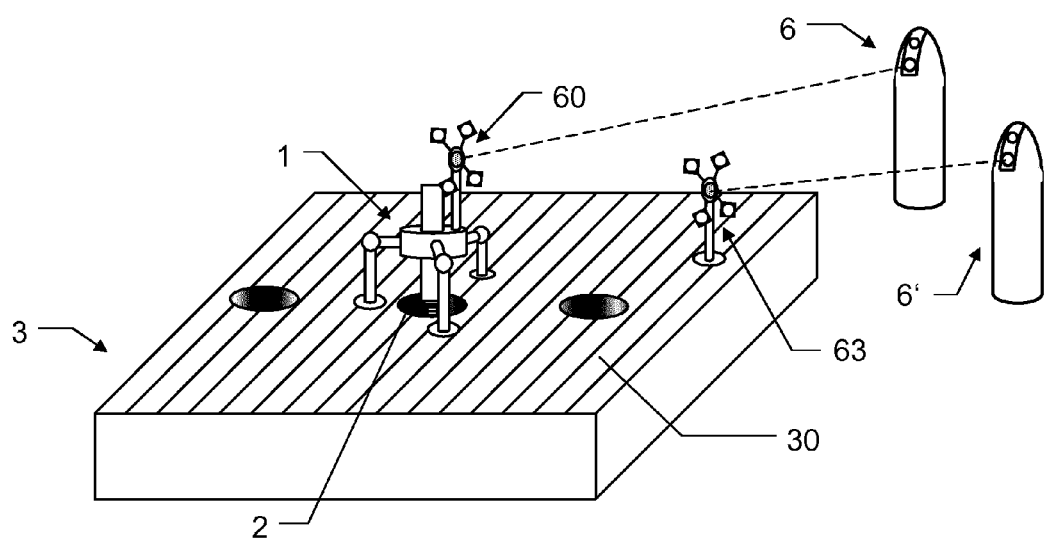

FIGS. 8a and 8b depict two further exemplary embodiments of the system of FIGS. 7a-b. These illustrate how a defined spatial relation between the mobile CMM 1 and the local structure 2 can be established through dynamical determination of a position and orientation of the CMM 1 and of the object 3 with respect to a common coordinate system. Surveying means 5,6,6' are provided to detect visible features 50,60 on the CMM 1 as well as visible features 53,63 on the object 3.

In FIG. 8a the surveying means is a stereo camera system 5 and the visible features are built as arrangements 50,53 of passive visible features such as one or more geometrical objects of well defined shape and/or colour (as described in FIG. 7a). A first arrangement of geometrical objects 50 is placed on the CMM 1, and a second arrangement of geometrical objects 53 is placed on the surface 30 of the object 3. The stereo camera system 5 is designed for dynamically detecting a position and orientation of the CMM 1 as well as of the object 3. Thus, a spatial relation between the CMM 1 and the local structure 2 of the object 3 is determinable with high precision.

In FIG. 8b the surveying means comprises two laser tracker systems 6,6' and the visible features are built as measuring aids 60,63 (as described in FIG. 7b) comprising a retro-reflector traceable by the laser trackers for measuring a position of the mobile CMM 1 and the object 3, respectively, and other features, in particular active light points, that are identifiable in the image of the cameras for deriving an orientation of the mobile CMM 1 and of the object 3, respectively. The first laser tracker system 6 is designed for dynamically detecting a position and orientation of the CMM 1, and the second laser tracker system 6' is designed for dynamically detecting a position and orientation of the object 3. Both laser tracker systems 6,6' are referenced in a common coordinate system, so that a spatial relation between the CMM 1 and the local structure 2 of the object 3 is determinable with high precision.

All visible features 50,53,60,63 shown in the FIGS. 7a-b and 8a-b can be attached to the CMM 1 or the surface 30, respectively, by means of sticking, magnets, adhesion, suction cups, glue, screws, bolts, clamps, etc. Preferably, the accuracy of the spatial relation between the visible features 50,53,60,63 and the CMM 1 or the surface 30, respectively, is at least as high as that of the measurement of the sensor means.

Particularly, the tolerance of the defined spatial relation between the CMM 1 and the local structure 2 to be measured is smaller than a characteristic resolution of the applied method for determining spatial coordinates of the measurement points of the local structure 2, in particular at least two decimal orders of magnitude smaller. As a result, possible imprecision in establishing the spatial relation is not relevant when compared with the typical measurement errors of the CMM 1. If the tolerance of the defined spatial relation is at least two orders of magnitude smaller, occurring errors are so small that they are generally not recognizable in the "random noise" of the measurement inaccuracies of the CMM 1. For example, if the measurement of the CMM 1 is accurate to a millimeter, the accuracy tolerance of the spatial relation would have to be smaller than that, e.g. a tenth of a millimeter (one order of magnitude smaller) or a hundredth of a millimeter (two orders of magnitude smaller).

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for determining at least one spatial coordinate of a measurement point of a local structure of an object, the method comprising:
providing a mobile coordinate measuring machine;
placing the mobile coordinate measuring machine on a surface of the object to be measured;
establishing a defined spatial relation between the coordinate measuring machine and the local structure, wherein the defined spatial relation is established by means of:
a mechanical fixation of the coordinate measuring machine to the object; and/or
a continuous determination of position and orientation of the coordinate measuring machine relative to the object, approaching the measurement point with a sensing head; and determining at least one spatial coordinate of the at least one measurement point.

2. The method according to claim 1, wherein:
positioning the mobile coordinate measuring machine relative to the local structure and maintaining the position, wherein:
the maintaining the position is fully autonomously by positioning means of the mobile coordinate measuring machine; and/or
the maintaining the position is in such a way that a position and orientation of the base and/or the sensor means is continuously determined relative to the local structure and/or relative to an external surveying instrument.

3. The method according to claim 1, wherein:
the local structure is a hole or a borehole, and approaching the measurement point comprises introducing a stylus of the mobile coordinate measuring machine into the hole basically along a central axis of the hole.

4. The method according to claim 3, wherein:
said determining of at least one spatial coordinate of the at least one measurement point comprises:
rotating the stylus around a rotational axis;
emitting a first measurement beam to a plurality of measurement points on a wall of the hole;
receiving reflections of the first measurement beam from the plurality of measurement points; and
determining spatial coordinates of the plurality of measurement points based on the reflections.

5. The method according to claim 1, wherein:
the defined spatial relation has a tolerance smaller than a characteristic resolution of the applied method for determining the at least one spatial coordinate of the at least one measurement point.

6. The method according to claim 1, wherein:
the position and orientation of the coordinate measuring machine and of the object are determined by at least one external surveying instrument and/or with respect to a reference coordinate system.

7. A coordinate measuring system for determining at least one spatial coordinate of a measurement point of a local structure of an object, comprising a mobile coordinate measuring machine designed for being placed on a surface of the object and comprising:
a base;
sensor means for measuring the measurement point and for generating measurement data, comprising a sensing head; and
a drive mechanism, adapted to drive the sensing head relative to the base for approaching the measurement point, wherein:
means for establishing a defined spatial relation between the mobile coordinate measuring machine and the local structure, wherein the defined spatial relation is achieved by means of:
a mechanical fixation of the mobile coordinate measuring machine to the object; and/or
a continuous determination of a position and orientation of the coordinate measuring machine relative to the object.

8. The coordinate measuring system according to claim 7, wherein:

the means for establishing the defined spatial relation have a tolerance smaller than a tolerance of the measurement of the sensor means that is at least two orders of magnitude smaller.

9. The coordinate measuring system a according to claim 7, wherein:
the coordinate measuring machine comprises:
alignment determination means for actively determining a position and orientation of the base and/or of the sensor means relative to the local structure and/or relative to an external surveying instrument; and/or
scanner means for scanning the surface of the object or the local structure;
the sensor means comprise a tactile sensing head being tiltable towards a measuring points by means of a hinge; and/or
the sensor means comprise:
emitter means for emitting an optical measurement beam;
receiver means for receiving reflections of the measurement beam; and
analyzing means for generating the measurement data based on the reflections, wherein spatial coordinates of a measurement point are derivable from the measurement data.

10. The coordinate measuring system according to claim 7, wherein the coordinate measuring machine comprises damping means for absorption or compensation of vibrations.

11. The coordinate measuring system according to claim 7, wherein:
the coordinate measuring machine comprises positioning means for autonomous positioning of the base relative to the local structure, the positioning means being designed to position the base relative to the local structure according to the measurement data to centre the base over a central point of the local structure.

12. The coordinate measuring system according to claim 7, wherein:
placing means, enabling the coordinate measuring machine to maintain a position at the surface autonomously comprising:
connecting means for connecting the placing means fixedly to the surface, wherein the connecting means comprises at least one of an electromagnet, a permanent magnet, a suction pad, and a vacuum cup with a vacuum pump; and/or
standing means for enabling the coordinate measuring machine to stand on the surface autonomously, wherein the standing means:
are linked to the base by at least three legs, wherein each leg comprises a set of leg members as positioning means, wherein the leg members are movable with respect to another in such a way that the base is positionable relative to the local structure; and/or
comprise wheels and/or rollers that are retractable and/or drivable by motor means.

13. The coordinate measuring system according to claim 7, wherein:
it is designed for determining at least one spatial coordinate of a measurement point of a hole of an object;
the sensing head is a stylus for approaching the measurement point; and the drive mechanism is adapted to rotate the stylus around a rotational axis and to drive the stylus in such a way that the stylus is capable to move relative to the base along the rotational axis;

wherein the stylus is introducible into the hole in such a way that at least one spatial coordinate of a measurement point of the hole is determinable.

14. The coordinate measuring system according to claim 13, wherein:
a first measurement beam is emittable from the stylus orthogonally to the rotational axis.

15. The coordinate measuring system according to claim 13, wherein:
a second measurement beam is emittable, wherein the first measurement beam and the second measurement beam are emitted into opposite directions;
a parallel measurement beam is emittable parallel to the first measurement beam; and/or
a vertical measurement beam is emittable orthogonal to the first measurement beam.

16. The coordinate measuring system according to claim 13, wherein:
the coordinate measuring machine comprises hole centring means, comprising at least three centring members designed for entering the hole and expanding towards the outer wall of the hole in order to position the base centrally over the hole.

17. The coordinate measuring system according to claim 7, wherein:
the coordinate measuring machine comprises visible features that are identifiable by external surveying means so that a position and orientation of the coordinate measuring machine relative to the surveying means is determinable, wherein:
the visible features are a set of geometrical objects of well-defined shape and/or colour, and the surveying means is a camera or a stereo camera system, or the visible features are a retro-reflector system with a retro-reflector and active or passive lighting means, and the surveying means is a laser tracker having camera means.

18. The coordinate measuring system according to claim 7, wherein:
data transfer means for sending data wireless to an external device and/or receiving data wireless from the external device, the external device being a display and control device, a computer or surveying means.

19. The coordinate measuring system according to claim 7, wherein:
an autonomous detection unit for autonomous detection of local structures to be measured on the surface of the object comprising at least one detection camera.

20. The coordinate measuring system according to claim 7, wherein:
the mobile coordinate measuring machine comprises an autonomous movement unit for autonomous movement on the surface for a movement of the mobile coordinate measuring machine to a detected local structure.

21. A coordinate measuring machine according to claim 7, comprising:
a base;
sensor means for measuring the measurement point and for generating measurement data, comprising a sensing head; and
a drive mechanism, adapted to drive the sensing head relative to the base for approaching the measurement point, wherein:
means for establishing a defined spatial relation with respect to the local structure.

22. One or more non-transitory computer-readable media storing one or more programs that are configured, when executed, to cause one or more processors to execute the method as recited in claim 7.

* * * * *